US012039531B2

(12) United States Patent
Considine et al.

(10) Patent No.: US 12,039,531 B2
(45) Date of Patent: Jul. 16, 2024

(54) SYSTEMS AND METHODS FOR IDENTIFYING DIMINISHED CAPACITY OF A VOICE CALL PARTICIPANT BASED ON AUDIO DATA ANALYSIS

(71) Applicant: FMR LLC, Boston, MA (US)

(72) Inventors: Eoghan Considine, Galway (IE); Luella Gergen Wong, Louisville, KY (US); Aidan Fogarty, Offaly (IE); Rosaleen Gilligan, Galway (IE); Shane Tully, Dublin (IE); Eamonn Fox, Galway (IE); Seemanthini Jois, Medford, MA (US); Jenson Joy, North Attleboro, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/139,482

(22) Filed: Apr. 26, 2023

(65) Prior Publication Data

US 2023/0342771 A1    Oct. 26, 2023

Related U.S. Application Data

(60) Provisional application No. 63/335,157, filed on Apr. 26, 2022.

(51) Int. Cl.
*G06Q 20/40*     (2012.01)
*G10L 25/30*     (2013.01)
*G10L 25/66*     (2013.01)
*H04M 3/22*      (2006.01)

(52) U.S. Cl.
CPC ............. *G06Q 20/40* (2013.01); *G10L 25/30* (2013.01); *G10L 25/66* (2013.01); *H04M 3/2236* (2013.01)

(58) Field of Classification Search
None
See application file for complete search history.

(56) References Cited

U.S. PATENT DOCUMENTS

| | | | | |
|---|---|---|---|---|
| 11,537,994 B2 * | 12/2022 | Cohen | ................ | G06Q 10/1091 |
| 2003/0031335 A1 * | 2/2003 | Roeck | .................... | H04R 25/70 |
| | | | | 381/317 |
| 2016/0314471 A1 * | 10/2016 | Gerber | ............... | G06Q 20/4014 |

* cited by examiner

*Primary Examiner* — Kito R Robinson
*Assistant Examiner* — Shacole C Tibljas
(74) *Attorney, Agent, or Firm* — Cesari & McKenna, LLP

(57) ABSTRACT

Systems and methods are described herein for identifying diminished capacity of a voice call participant based on audio data analysis. A server generates an audio image based on an audio file comprising speech data corresponding to a first user on a voice call. The server determines a diminished capacity score based on one or more characteristics of the audio image analyzed using a deep learning classification model. The server applies a security protocol to an account associated with the first user when the diminished capacity score is at or above a threshold value. The server receives a transaction request corresponding to the account from the first user. The server processes the transaction request based on the security protocol applied to the account.

26 Claims, 9 Drawing Sheets

Upload a single audio file (.wav or .mp3) to determine if the individual has diminished capacity or not.
The result will be displayed once the audio file has been processed.

UPLOAD A FILE

Choose File  No file chosen — 302

Upload File — 304

Process Audio File — 306

Cancel

Select the parameters you want analyzed: audio length, age and date range.

SELECT PARAMETERS

Audio Length — 308

Age Range — 310

Date  mm/dd/yyyy — 312

Submit

Cancel

Add Second Signature

Enable Second Signature on Payments and Transfers so that your trusted network has greater transparency to support activity for your accounts.

Payment Types

Select the payment types — 602

- ☒ All
- ☒ ATM Debit Card
- ☒ Bank Wire
- ☒ Deposit Slips
- ☒ Electronic Funds Transfer (EFT)
- ☒ Automatic Transfer and Investments
- ☒ BillPay®
- ☒ Direct Debit
- ☒ Foreign Currency Wire Transfers
- ☒ Automatic Withdrawals
- ☒ Checkwriting (including reorders)
- ☒ Direct Deposit
- ☒ Mobile Check Deposit

Signature

Would you like to require additional signature(s) before transactions are processed?

Signature Threshold — 604

$ 1,000.00

| Name | Phone Number | Relationship | Signature | Notify |
|---|---|---|---|---|
| Rosa Sanchez | (281) 555-3456 | POA | ● | ● |
| Lucille Sanchez | (209) 555-8081 | LTA | ○ | ● |

SYSTEMS AND METHODS FOR IDENTIFYING DIMINISHED CAPACITY OF A VOICE CALL PARTICIPANT BASED ON AUDIO DATA ANALYSIS

RELATED APPLICATIONS

This application claims priority to U.S. Provisional Patent Application No. 63/335,157, filed on Apr. 26, 2022, the entirety of which is incorporated herein by reference.

TECHNICAL FIELD

This application relates generally to systems and methods for identifying diminished capacity of a voice call participant based on audio data analysis, including analyzing and classifying an audio image generated from a voice call using a deep learning classification model.

BACKGROUND

Many organizations, including financial institutions, rely on manual intervention from phone representatives to identify customers showing signs of diminished capacity on voice call interactions. As people age, it is not uncommon to observe a gradual decrease in mental acuity in several areas, such as speed of thought, attention span, multitasking, retaining information, and word-finding (see, e.g., Daniel L. Murman, M. D., "The Impact of Age on Cognition," *Seminars in Hearing* 36(3), pp. 111-121 (2015)). In addition, a person may begin to exhibit diminished financial capacity, which is a decline in a person's ability to manage financial assets to best serve their interests. If diminished capacity is suspected, the customer's account is restricted and flagged as "at risk" for further analysis. Typically, conversations between customers and service personnel such as customer service agents over digital communication channels (phone, video chat) are recorded and stored as digital audio files. In existing approaches, each digital audio file is analyzed manually by an agent that listens to playback of the file to determine whether the customer is exhibiting any speech characteristics that suggest diminished capacity.

Some organizations flag thousands of phone calls per month based on analysis by phone agents. This process is time-consuming and can be inaccurate. Therefore, there is a need for a software tool that can assist phone representatives in detecting diminished capacity and also protect customers with signs of diminished capacity through voice analysis.

SUMMARY

Accordingly, what is needed are methods and systems for automatically identifying diminished capacity through deep learning-based analysis of digital audio files captured from a voice call between the customer and the service agent. The techniques described herein beneficially enable the training and execution of a classification model that can accurately and efficiently classify audio images generated from a digital waveform of the voice call to determine whether a customer on the call is exhibiting diminished capacity or not. After a determination is made, the systems and methods herein advantageously provide for the application of a customized security protocol to the customer's accounts and transactions to protect the customer's assets from ill-advised or erroneous depletion by initiating a workflow for secondary review and approval.

The invention, in one aspect, features a system for identifying diminished capacity of a voice call participant based on audio data analysis. The system includes a server computing device having a memory for storing computer-executable instructions and a processor that executes the computer-executable instructions. The server computing device generates an audio image based on an audio file comprising speech data corresponding to a first user on a voice call. The server computing device determines a diminished capacity score based on one or more characteristics of the audio image analyzed using a deep learning classification model. The server computing device applies a security protocol to an account associated with the first user when the diminished capacity score is at or above a threshold value. The server computing device receives a transaction request corresponding to the account from the first user. The server computing device processes the transaction request based on the security protocol applied to the account.

The invention, in one aspect, features a computerized method of identifying diminished capacity of a voice call participant based on audio data analysis. A server computing device generates an audio image based on an audio file comprising speech data corresponding to a first user on a voice call. The server computing device determines a diminished capacity score based on one or more characteristics of the audio image analyzed using a deep learning classification model. The server computing device applies a security protocol to an account associated with the first user when the diminished capacity score is at or above a threshold value. The server computing device receives a transaction request corresponding to the account from the first user. The server computing device processes the transaction request based on the security protocol applied to the account.

Any of the above aspects can include one or more of the following features. In some embodiments, the audio image comprises a Mel-Frequency Cepstral Coefficients (MFCC) spectrum image. In some embodiments, the deep learning classification model comprises a convolutional neural network. In some embodiments, the server computing device trains the deep learning classification model to label audio images for diminished capacity using a training data set comprised of (i) existing MFCC spectral images labeled as diminished capacity, (ii) existing MFCC spectral images labeled as not diminished capacity and (iii) unlabeled MFCC spectral images. In some embodiments, the server computing device re-trains the trained deep learning classification model after the model has classified one or more audio images that are not part of the training dataset.

In some embodiments, the server computing device adjusts the diminished capacity score based on one or more of: a comparison of the diminished capacity score to one or more historical diminished capacity scores corresponding to the first user, an age of the first user, speech to text analysis of the audio file, or feedback from prior voice calls involving the first user. In some embodiments, the security protocol defines one or more account transactions that are prohibited when the diminished capacity score is at or above the threshold value. In some embodiments, the security protocol defines one or more account transactions that require review by a second user prior to execution when the diminished capacity score is at or above the threshold value. In some embodiments, processing the transaction request comprises transmitting a transaction review request to a computing device of the second user upon receiving the transaction request corresponding to the account from the first user. In some embodiments, the server computing device transmits an execution instruction to a transaction processing system when the second user completes a review of the transaction request.

In some embodiments, the security protocol defines one or more account transactions that require approval by a second user prior to execution when the diminished capacity score is at or above the threshold value. In some embodiments, processing the transaction request comprises transmitting a transaction approval request to a computing device of the second user upon receiving the transaction request corresponding to the account from the first user. In some embodiments, the server computing device transmits an execution instruction to a transaction processing system when the second user approves the transaction request.

Other aspects and advantages of the invention described herein can become apparent from the following drawings and description, all of which illustrate the principles of the invention described herein, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
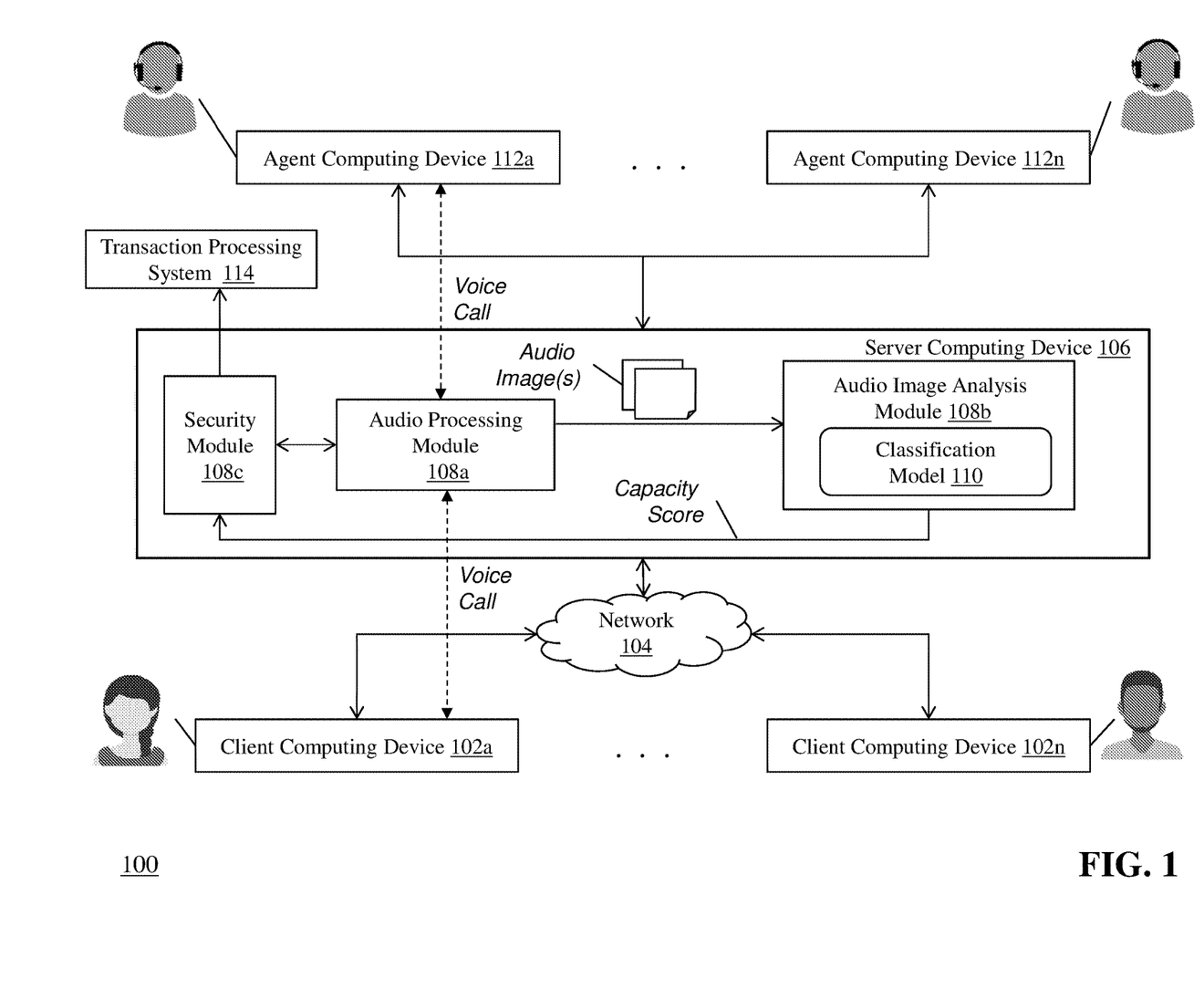
FIG. 1 is a block diagram of a system for identifying diminished capacity of a voice call participant based on audio data analysis.

FIG. 1 is a block diagram of system 100 for identifying diminished capacity of a voice call participant based on audio data analysis. System 100 includes client computing devices 102a-102n, communications network 104, server computing device 106 that includes audio processing module 108a, security module 108b, and audio image analysis module 108c with deep learning classification model 110, a plurality of agent computing devices 112a-112n, and a transaction processing system 114.

Client computing devices 102a-102n connect to one or more communications networks (e.g., network 104) in order to communicate with server computing device 106 to provide input and receive output relating to one or more voice call communication sessions as described herein. Exemplary client computing devices 102a-102n include but are not limited to server computing devices, desktop computers, laptop computers, tablets, mobile devices, smartphones, and the like. It should be appreciated that other types of computing devices that are capable of connecting to the components of system 100 can be used without departing from the scope of invention. Although FIG. 1 depicts two client computing devices 102a-102n, it should be appreciated that system 100 can include any number of client computing devices. In some embodiments, each client computing device 102a-102n is configured with voice communication application software, which enables client computing devices 102a-102n to establish a voice-based communication session with server computing device 106 via audio processing module 108a. It should be appreciated that the term "voice call" should not be understood as being limited to only traditional telephone call sessions, but also encompasses the audio component of a video chat communication session conducted via video conferencing software such as Zoom™ Microsoft® Teams™, WebEx®, or other similar platforms.

Communications network 104 enables client computing devices 102a-102n to communicate with server computing device 106. Network 104 is typically comprised of one or more wide area networks, such as the Internet and/or a cellular network, and/or local area networks. In some embodiments, network 104 is comprised of several discrete networks and/or sub-networks (e.g., cellular to Internet).

Server computing device 106 is a device including specialized hardware and/or software modules that execute on a processor and interact with memory modules of server computing device 106, to receive data from other components of system 100, transmit data to other components of system 100, and perform functions for identifying diminished capacity of a voice call participant based on audio data analysis as described herein. Server computing device 106 includes audio processing module 108a, security module 108b, and audio image analysis module 108c that execute on one or more processors of server computing device 106. In some embodiments, audio processing module 108a, security module 108b, and audio image analysis module 108c are specialized sets of computer software instructions programmed onto one or more dedicated processors in server computing device 106.

As can be appreciated, in some embodiments audio processing module 108a is a component of a voice communication software application hosted by server computing device 106. Generally, audio processing module 108a is configured to capture at least a portion of the digital audio exchanged between client computing devices 102a-102n and agent computing devices 112a-112n that corresponds to a voice conversation between a user at client devices 102a-102n and an agent at agent devices 112a-112n. Audio processing module 108a can store and/or record at least a portion of the digital audio during a voice call. In some embodiments, module 108a stores the digital audio as one or more files in any number of different compressed or non-compressed formats, including but not limited to: M4A, FLAC, MP3, MP4, WAV, WMA, among others. In some embodiments, module 108a captures and processes the digital audio as a data stream and performs the processing described herein in real time during the voice call. In some embodiments, audio processing module 108a can perform one or more signal processing operations on the captured digital audio—such as downsampling, compression, noise reduction, filtering, transform, or other types of digital audio processing—in order to isolate particular segments of the voice call and/or improve the ability for audio processing module to analyze the audio as will be described herein.

Another component of audio processing module 108a is converting the digital audio captured from the voice call into one or more audio images that are used by audio image analysis module 108b and classification model 110 to determine whether a participant on the voice call has diminished capacity. In some embodiments, audio processing module 108a extracts at least a portion of the digital audio corresponding to speech of the user at client device 102a-102n and converts the portion of the digital audio into an image file that is transferred to module 108b for feature extraction and analysis by model 110. In some embodiments, the audio image file comprises a Mel-Frequency Cepstral Coefficients (MFCC) spectrum image generated by module 108a from an audio file (e.g., WAV). An exemplary software library that can be used by audio processing module 108a to generate the MFCC spectral images is the librosa Python library, as described in B. McFee et al., "librosa: Audio and Music Signal Analysis in Python," *Proceedings of the 14th Python in Science Conference* (*SCIPY* 2015), published at conference.scipy.org/proceedings/scipy2015/pdfs/brian_mcfee.pdf, which is incorporated herein by reference.

In some embodiments, client computing devices 102a-102n include an application that executes on devices 102a-102n to provide certain functionality to a user of the device. In some embodiments, client computing devices 102a-102n can include a native application installed locally on devices 102a-102n. For example, a native application is a software application (also called an 'app') that written with programmatic code designed to interact with an operating system that is native to client computing device 102a-102n and provide information and application functionality (such as a voice call interface or a video call interface) to a user of client computing device 102a-102n. In the example where client computing device 102a-102n is a mobile device such as a smartphone, the native application software can be part of the operating system of the device and/or be available for download from, e.g., the Apple® App Store or the Google® Play Store. In some embodiments, the native application includes a software development kit (SDK) module that is executed by a processor of client computing device 102a-102n. In other embodiments, client computing device 102a-102n can include a browser application that runs on the client computing device 102a-102n and connects to one or more other computing devices (e.g., server computing device 106) for retrieval and display of information and application functionality (such as conducting a voice call communication session with one or more agent computing devices 112a-112n via audio processing module 108a). In one example, the browser application enables client computing device 102a-102n to communicate via HTTP or HTTPS with server computing device 106 (e.g., via a URL) to receive website-related content, including one or more webpages, for rendering in the browser application and presentation on a display device coupled to client computing device 102a-102n. In some embodiments, the webpages can include functionality to enable the establishment of a voice call communication session between client devices 102a-102n and agent devices 112a-112n. Exemplary browser application software includes, but is not limited to, Firefox™ Chrome™, Safari™, and other similar software.

Audio image analysis module 108b comprises a specialized hardware and/or software module (e.g., firmware, middleware, etc.) which executes on one or more processors of server computing device 106 for the purpose of analyzing audio images received from audio processing module 108a and determining a diminished capacity decision associated with the audio images using, e.g., classification model 110. As mentioned above, audio image analysis module 108b can analyze MFCC spectral images corresponding to a portion of a voice call that includes speech uttered by a user of client device 102a-102n. Module 108b can extract one or more features from each spectral image and convert the extracted features into a format that can be used as input to classification model 110 for the purpose of determining whether the user at client device 102a-102n is showing signs of diminished capacity based upon their speech. The general aspects of MFCC are described in S. Davis and P. Mermelstein, "Comparison of parametric representations for monosyllabic word recognition in continuously spoken sentences," *IEEE Transactions on Acoustics, Speech and Signal Processing*, Vol. 28, No. 4, pp. 357-366 (1980) and additional details on the extraction of MFCC features for analysis are described in S. A. Majeed et al., "Mel Frequency Cepstral Coefficients (MFCC) Feature Extraction Enhancement in the Application of Speech Recognition: A Comparison Study," *Journal of Theoretical and Applied Information Technology*, vol. 79, No. 1, pp. 38-56 (2015) each of which is incorporated herein by reference.

In some embodiments, audio image analysis module 108b can perform a feature selection process to identify particular features extracted from the MFCC spectral image that may be more relevant to the determination of diminished capacity than others. For example, audio image analysis module 108b can be configured to select a subset of image features that are correlated to speech elements that are known to be exhibited by individuals with diminished capacity. In some embodiments, module 108b can apply one or more weighting algorithms to emphasize certain spectral image features in the subset that are more indicative of diminished capacity.

Advantageously, audio image analysis module 108b leverages a trained deep learning classification model 110 to perform an automated analysis of the feature set for each spectral image and generate a classification of whether the feature set corresponds to known or expected features that are associated with diminished capacity. It should be appreciated that any of a number of different classification model architectures can be used in classification model 110 including but not limited to: neural networks; support vector machines (SVMs); generative models; or other types of deep learning frameworks. In one embodiment, classification model 110 comprises a convolutional neural network (CNN) such as ResNet-18 that has been pretrained on a large number of images. Prior to deploying the classification model 110 in module 108b, the model is customized to be able to classify the specific type of MFCC spectral images described herein using transfer learning. For example, a training dataset comprised of (i) existing MFCC spectral images labeled as diminished capacity, (ii) existing MFCC spectral images labeled as not diminished capacity and (iii) unlabeled MFCC spectral images are used to train and test the baseline ResNet-18 model. During training, the classification results generated by the model are evaluated to determine the model's accuracy (e.g., precision, recall, receiver operating characteristic (RoC) curves, etc.). When training is complete, the trained model 110 is now configured to classify unlabeled MFCC spectral images generated by audio processing module 108a for diminished capacity at a high accuracy. Additional details about ResNet models that can be trained and deployed in system 100 are described in K. He et al., "Deep Residual Learning for Image Recognition," arXiv:1512.03385v1 [cs.CV] 10 Dec. 2015, available at arxiv.org/pdf/1512.03385.pdf, which is incorporated herein by reference.

Security module 108c comprises a specialized software module which executes on one or more processors of server computing device 106 for the purpose of triggering the application of a security protocol associated with the user of client device 102a-102n based upon the diminished capacity evaluation performed by audio image analysis module 108b and classification model 110 as described below. Generally, security module 108c receives a diminished capacity decision from audio image analysis module 108b and determines whether a security protocol should be applied based upon the capacity decision. If module 108c determines that a security protocol workflow should be applied, module 108c communicates with one or more transaction processing systems (not shown) to initiate application of the security protocol. For example, module 108c can instruct the transaction processing systems to apply a second signature security protocol to one or more financial accounts associated with the user of client device 102a-102n.

Although audio processing module 108a, audio image analysis module 108b, and security module 108c are shown in FIG. 1 as executing within the same server computing device 106, in some embodiments the functionality of modules 108a-108c can be distributed among one or more other computing devices that are coupled to server computing device 106. As shown in FIG. 1, server computing device 106 enables modules 108a-108c to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of modules 108a-108c will be described in greater detail throughout this specification.

Transaction processing system 114 comprises one or more computing devices that are configured to receive requests from remote computing devices, transmit data to remote computing devices, and perform processing relating to one or more aspects of the operations for an organization (e.g., account transaction execution for a financial services organization). In some embodiments, transaction processing system 114 is configured to receive instructions from security module 108c to apply a security protocol to one or more accounts associated with a user based upon a diminished capacity determination as performed by server computing device 106. An example of a security protocol that can be applied to one or more user accounts is the requirement that a second authorization or signature is obtained before the transaction processing system 114 can carry out an account-based transaction requested by a user that has been deemed to have diminished capacity.

Figure 2:
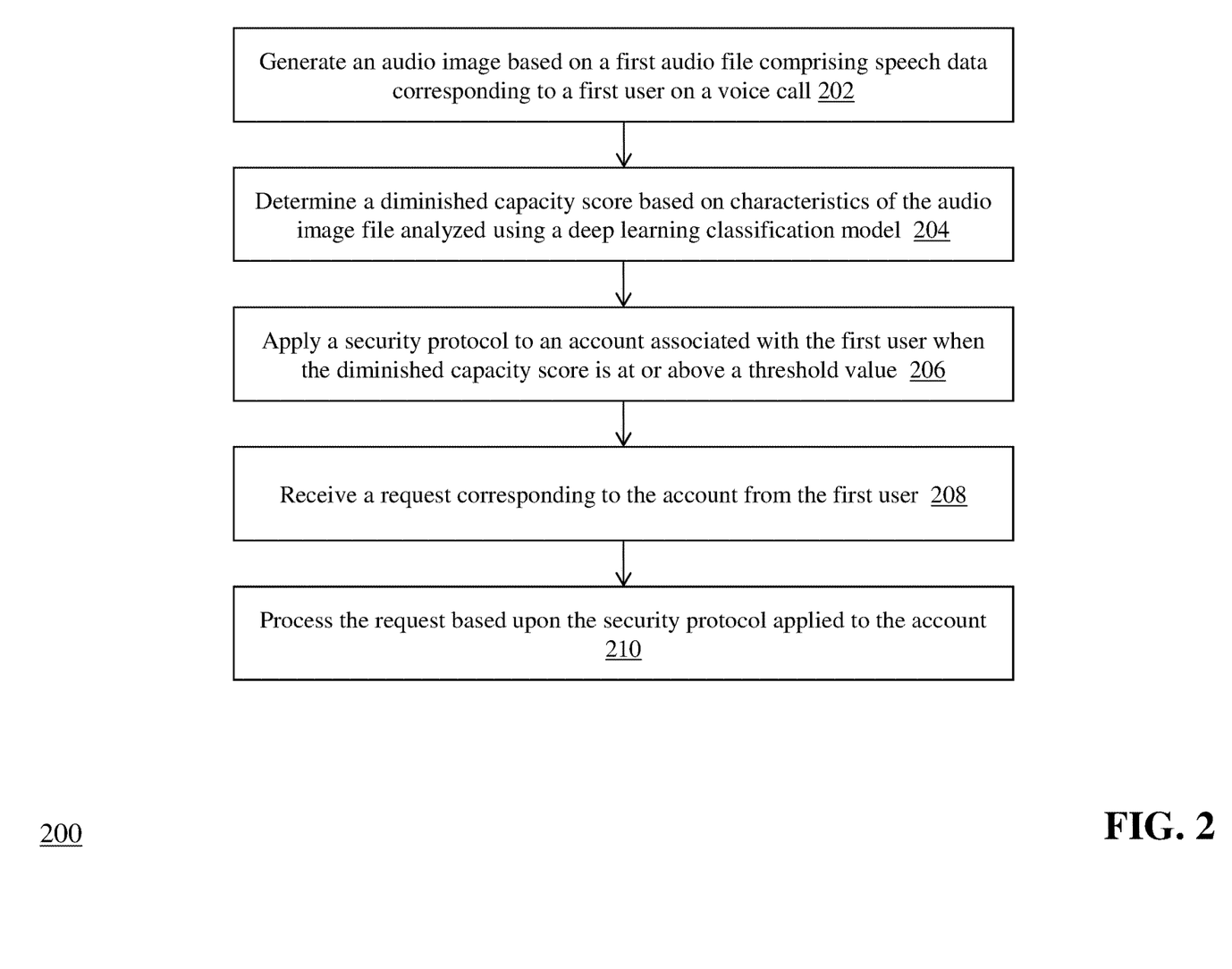
FIG. 2 is a flow diagram of a computerized method of identifying diminished capacity of a voice call participant based on audio data analysis.

FIG. 2 is a flow diagram of a computerized method of identifying diminished capacity of a voice call participant based on audio data analysis via a deep learning model, using system 100 of FIG. 1. As described previously, audio processing module 108a captures digital audio from a voice conversation between a user at client computing device 102a-102n and an agent at agent computing device 112a-112n. As one example, the user may be a customer of a financial institution holding one or more accounts with the institution. The user initiates a voice call or video chat with an agent of the financial institution to receive information, ask questions, and/or perform one or more transactions with respect to their accounts (e.g., money transfer or withdrawal, securities purchase, re-allocation of investment strategy, among others). During the conversation, module 108a can record the conversation for storage as one or more digital audio files and/or a digital audio stream. In some embodiments, audio processing module 108a is configured to programmatically separate the captured digital audio into two channels, i.e., Channel A for the audio from client device 102a-102n and Channel B for the audio from agent device 112a-112n. For example, audio processing module 108a can store the audio detected as being received from client computing device 102a-102n in a first storage area or file, and store the audio detected as being received from agent computing device 112a-112n in a second storage area or file. Separation of the digital audio in this fashion beneficially enables audio processing module 108a to analyze only the speech associated with the customer for signs of diminished capacity and avoid incorporating any features of the speech of the agent that could generate an erroneous capacity decision.

In some embodiments, the captured digital audio files are archived in a storage repository for later retrieval and processing as described herein. For example, audio processing module 108a can record digital audio during the voice call without generating an audio image at the time the voice call occurs. At a subsequent time, server 100 can be configured to retrieve the stored digital audio that corresponds to the voice call and analyze the audio to determine a capacity decision as described herein. In some embodiments, module 108a captures and analyzes the digital audio in real time as the voice call proceeds, so as to render a capacity decision while the user is still participating in the voice call with the agent. In these embodiments, when audio image analysis module 108b determines that the user is exhibiting signs of diminished capacity, security module 108c can issue a notification message to agent computing device 112a that informs the agent of the decision so that the agent can implement designated account or transaction workflows (such as second signature) when assisting the customer. Security module 108c can also concurrently instruct transaction processing system 114 to apply a particular security protocol to one or more of the user's accounts when the notification message is sent to the agent.

Figure 3:
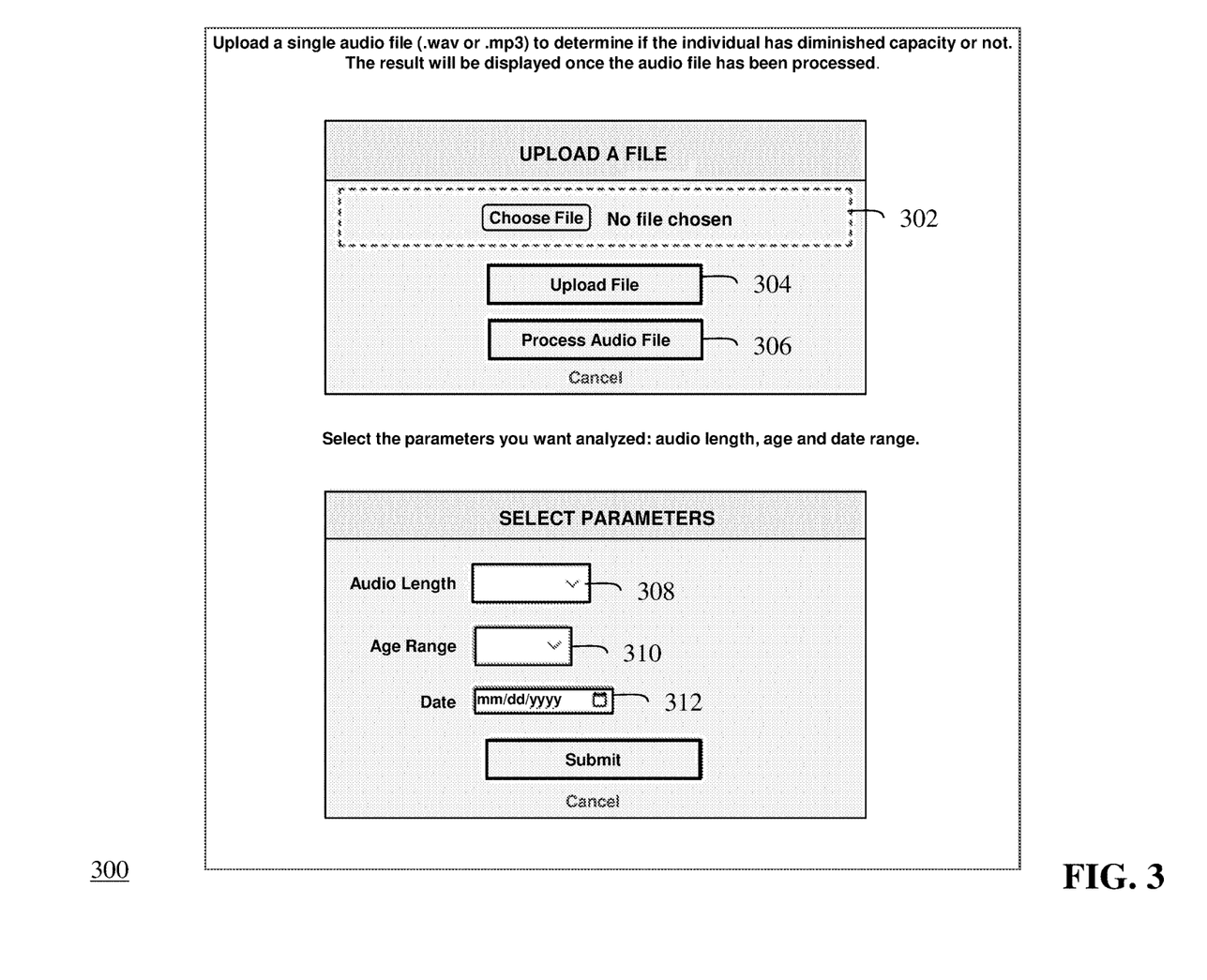
FIG. 3 is a diagram of an exemplary user interface for initiating analysis of digital audio data files recorded during a voice call between a customer and an agent.

FIG. 3 is a diagram of an exemplary user interface 300 for initiating analysis of digital audio data files recorded during a voice call between a customer and an agent. A remote user (such as a customer service representative or compliance monitor) can connect via a remote computing device to server computing device 106 in order to select one or more digital audio files for diminished capacity analysis. The remote user is presented with interface 300, which enables the remote user to select a digital audio file 302, upload a digital audio file 304, and process the audio file 306 using one or more user input features. In addition, user interface 300 provides input elements that enable the remote user to specify parameters used by audio image analysis module 108b when processing an audio image, including audio length 308, age range 310, and date range 312. Further details about the usage of such parameters in the context of audio analysis and capacity determination will be provided below.

Figure 4:
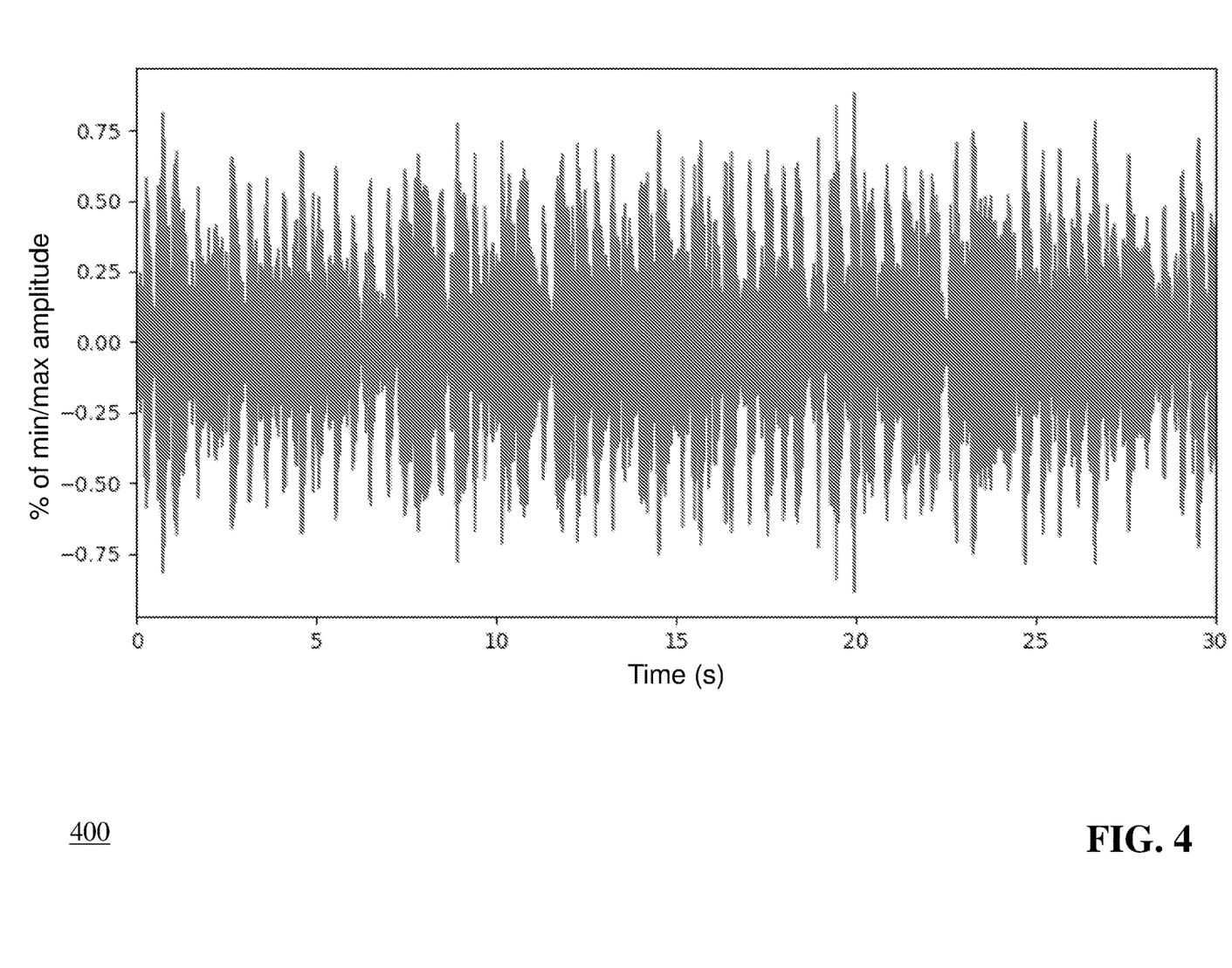
FIG. 4 is a diagram of an exemplary waveform signal extracted from a digital audio file that corresponds to speech of a user at a client device.
Figure 5:
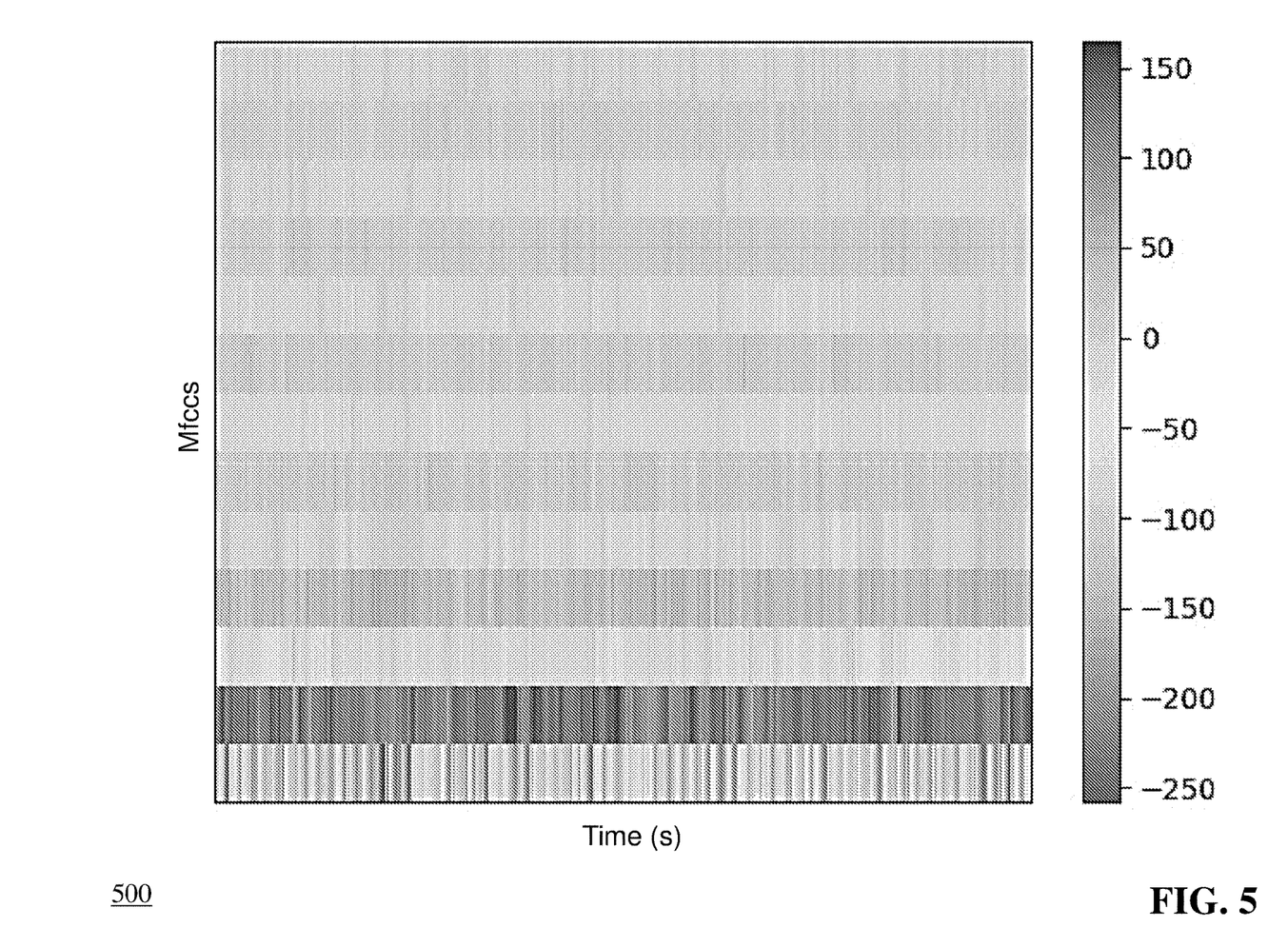
FIG. 5 is a diagram of an exemplary MPCC spectral image generated by an audio processing module.

As mentioned previously, audio processing module 108a extracts at least a portion of the digital audio corresponding to speech of the user at client device 102a-102n and converts the portion of the digital audio into an image file that is transferred to module 108b for feature extraction and analysis by model 110. FIG. 4 is a diagram of an exemplary waveform signal 400 extracted from the digital audio file that corresponds to speech of the user at client device 102a-102n. Module 108a extracts the raw waveform signal 400 from the digital audio file (e.g., WAV file) and converts the waveform signal into an MFCC spectral image that comprises the Mel-Frequency Cepstral Coefficients corresponding to the waveform data. FIG. 5 is a diagram of an exemplary MFCC spectral image 500 generated by audio processing module 108a. As shown in FIG. 5, the image 500 comprises the MFCCs of the audio signal captured in the digital audio file. Generally, the MFCCs contain information about rate changes in different spectrum bands. As mentioned above, audio processing module 108a can generate the MFCC spectral image for a given waveform using the librosa Python library.

Once the audio image is generated, audio processing module 108a transmits the audio image to audio image analysis module 108b. Module 108b determines (step 204) a diminished capacity score associated with the user of client device 102a-102n based on characteristics of the audio image that are analyzed using classification model 110. As set forth previously, audio image analysis module 108b can extract one or more features of the incoming audio image as an input data set for model 110, which is trained to classify such features as corresponding to a person exhibiting diminished capacity or not. Using the input feature set, module 108b executes classification model 110 to generate a classification score for the input feature set. In some embodiments, the classification score generated by model 110 is a binary value (e.g., 0 indicates diminished capacity, 1 indicates no diminished capacity). In some embodiments, the classification score generated by model 110 is a decimal value or a range of values (e.g., values between 0 and 0.5 indicate diminished capacity, values between 0.51 and 1.00 indicate no diminished capacity). It should be appreciated that the above classification scores are merely exemplary and other methodologies for determining and applying particular classification score schemes can be contemplated within the scope of the technology described herein.

In some embodiments, audio image analysis module 108b can evaluate other criteria or data sets in conjunction with the audio image processing described herein in order to arrive at a diminished capacity decision. An important aspect of the processing performed by audio image analysis module 108b is the ability to reference historical data associated with a particular customer in order to compare the historical data to the current data when deciding whether the customer shows signs of diminished capacity. For example, module 108b can retrieve one or more historical classification scores associated with audio data previously captured by module 108a for the customer (e.g., during prior voice calls). Module 108b can compare the classification scores and/or the underlying audio data (i.e., audio images) to evaluate whether there has been a significant change in the classification scores over time and/or with respect to the current voice call. As an example, if a user's historical diminished capacity classification scores had been in a particular range, but the current classification score for the user is well below the range, module 108b can adjust or weight the current classification score to account for this change in score from historical values.

Other types of data elements that can be used by module 108b to reach an overall diminished capacity decision in combination with the classification score returned by model 110 include the following (without limitation):

Speech to text scoring—in some embodiments, audio processing module 108a can convert the captured digital audio file into a text string using, e.g., a speech recognition algorithm such as described in P. A. Trivedi, "Introduction to Various Algorithms of Speech Recognition: Hidden Markov Model, Dynamic Time Warping and Artificial Neural Networks," *International Journal of Engineering Development and Research* (*IJEDR*), Vol. 2, Issue 4, pp. 3590-3596 (2014), which is incorporated herein by reference. Examples of speech recognition software that can be used with module 108a include the SpeechRecognition Python library (pypi.org/project/SpeechRecognition) and Google® Cloud Speech-to-Text™ API (cloud.google.com/speech-to-text). Audio image analysis module 108b can analyze characteristics of the text string, such as context, grammar, word patterns, sentiment, language choice, and similar aspects to determine whether the user is exhibiting signs of diminished capacity. Additional details about the evaluation of spoken words in the context of diminished capacity is described in R. Voleti et al., "A Review of Automated Speech and Language Features for Assessment of Cognitive and Thought Disorders," *IEEE Journal of Selected Topics in Signal Processing* (JSTSP), Special Issue, arXiv: 1906.01157v2 [cs.CL] 5 Nov. 2019, which is incorporated herein by reference. Additionally, module 108b can compare the text characteristics of the current utterances of the user with historical data associated with text characteristics of prior utterances of the user captured by audio processing module 108a, in order to determine whether the user is exhibiting diminished capacity.

Age—as can be appreciated, the age of a customer may correlate to an increased likelihood of diminished capacity. Audio image analysis module 108b can retrieve a known or estimated age of the user at client device 102a-102n when determining a classification score and factor the user's age into the overall diminished capacity decision. For example, module 108b can retrieve a user profile associated with the customer and determine the customer's age using, e.g., a date of birth stored in the profile. As described above with respect to FIG. 3, a remote user can alternatively provide the age information via user interface. Module 108b can weigh the diminished capacity decision rendered by the classification model 110 differently based upon an age of the customer—e.g., older customers may be weighted more in favor of diminished capacity while younger customer may be weighted more in favor of non-diminished capacity.

Agent Feedback—another important data element that can be incorporated into the determination of diminished capacity is based upon observations and feedback provided by an agent at device 112a-112n participating in the voice call with a customer. During a given call, the agent may notice that the customer is having a difficult time remembering certain facts (e.g., account number, date of birth, last 4 digits of social security number, etc.), cannot properly articulate their responses to agent questions, or have trouble speaking clearly. The agent can record their observations during the voice call (e.g., in a designated user interface area on agent device 112a-112n) for storage and retrieval by agent image analysis module 108b. In some embodiments, the agent's feedback is recorded as structured or unstructured text. In some embodiments, the agent completes a survey or checklist with their responses to preconfigured questions relating to the customer's perceived mental capacity during the call. Module 108b can analyze the agent feedback to determine whether the classification score and/or diminished capacity decision should be adjusted. In addition, module 108b can compare the agent feedback from the current voice call with historical agent feedback from prior calls involving the user at client device 102a-102n in order to determine whether the user is exhibiting diminished capacity.

Any or all of these data elements can be incorporated along with the classification score generated by model 110 into an overall diminished capacity score. In some embodiments, the diminished capacity score is compared to a defined threshold score to determine whether the user is exhibiting signs of diminished capacity. In one example, users who receive a diminished capacity score at or above the threshold value are designated as exhibiting diminished capacity, while users who receive a diminished capacity score below the threshold value are designated as not exhibiting diminished capacity. In some embodiments, the threshold value is the same for each user while in other embodiments, the threshold value can be adjusted based upon one or more of the above factors (e.g., age, historical interactions, historical feedback, etc.).

Upon receiving the diminished capacity score from audio image analysis module 108b, security module 108c applies (step 206) a security protocol to an account associated with the user at client device 102a-102n when the diminished capacity score is at or above a threshold value. As can be appreciated, in order to prevent the customer from making errors or misguided decisions with respect to account transactions in situations where they may be at diminished capacity, security module 108c can automatically implement security protections on the customer's accounts in transaction processing system 114. An example of these security protections is the monitoring of transaction requests to prevent transactions from executing unless a third party is notified, at which point the third party can review and approve the transaction requests. This process is also called a second signature process. In many cases, a close relative, guardian, or other person who is responsible for the well-being of the customer can be designated as the third party who retains review and approval duties for the customer's transactions.

Figure 6:
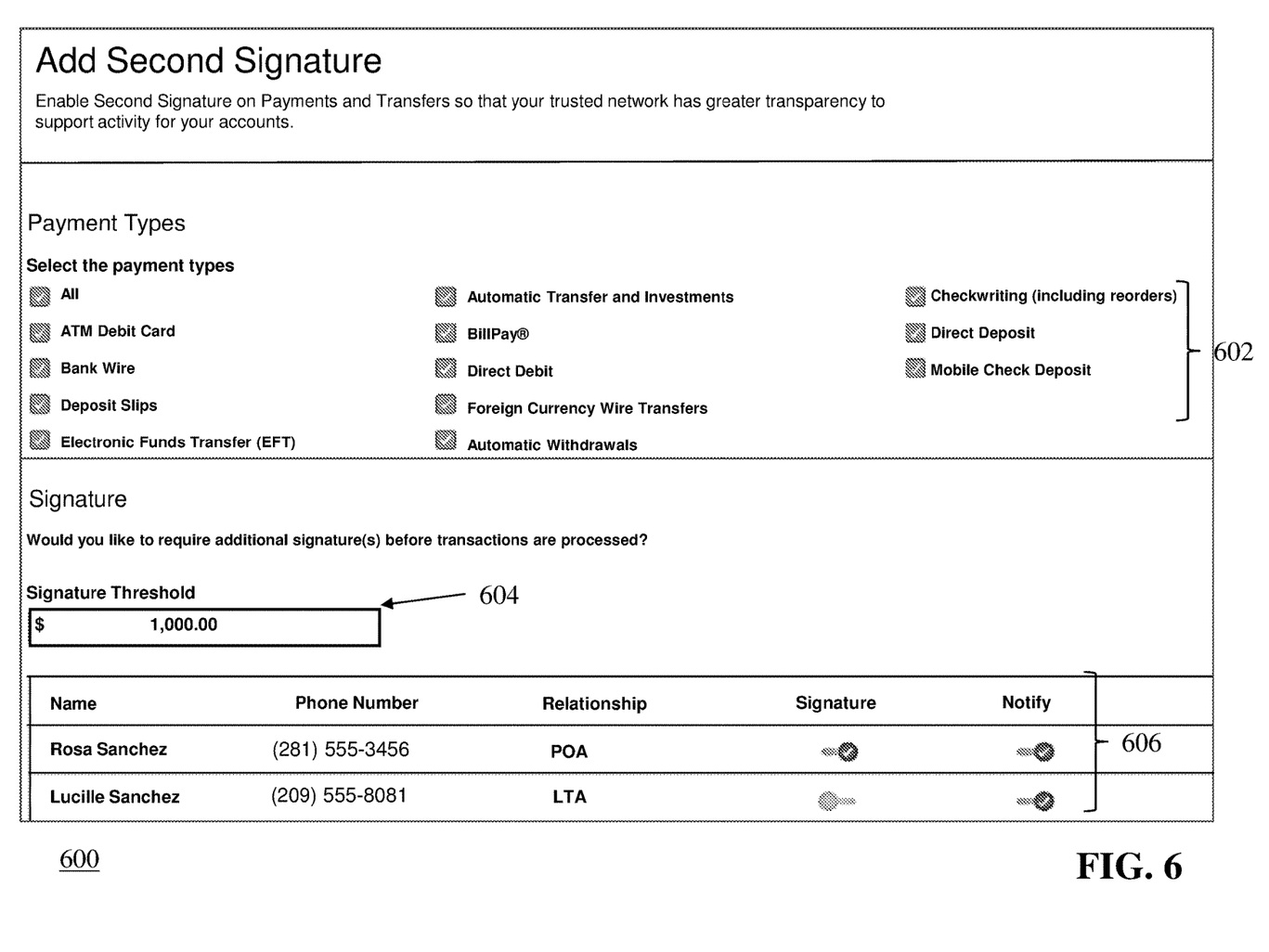
FIG. 6 is a diagram of an exemplary user interface for configuration of a security protocol by a security module.

In some embodiments, the security protocol is configured by the customer and/or the third party prior to any subsequent diminished capacity decisions by system 100. FIG. 6 is a diagram of an exemplary user interface 600 for configuration of a security protocol by security module 108c. As shown in FIG. 6, the customer and/or third party can select one or more transaction/payment types 602 for which the security protocol will apply when diminished capacity is identified. The user interface 600 also enables the customer to designate a particular amount threshold 604 above which third party review and/or approval is required. The specific third parties, their contact information, relationship to the customer, and their corresponding tasks 606 (i.e., Signature, Notify) are also available for configuration.

In some embodiments, to apply the security protocol, security module 108c transmits instructions to transaction processing system 114 to update a user account profile associated with the customer. Transaction processing system 114 can, e.g., change one or more data fields in the user account profile to reflect the security protocol. For example, system 114 can flag the user account profile as "high-risk"—meaning that any transactions initiated by the customer must be approved using the second signature process. In another example, system 114 can configure certain rules or parameters associated with the customer's accounts that are evaluated for every transaction initiated by the customer and that will trigger the second signature process if satisfied—such as transactions over a defined dollar amount, transactions requested against certain account(s), transactions requested using certain channels (e.g., mobile device), and so forth.

Once the security protocol is applied to the customer's account(s), transaction processing system 114 implements the security protocol on subsequent transaction requests received from the user. The following is an exemplary use case for the second signature process applied by security module 108c when a customer is designated as exhibiting diminished capacity by audio image analysis module 108b.

Transaction processing system 114 receives (step 208) a request from the customer (e.g., via client computing device 102a-102n) that involves a transaction corresponding to one or more of the customer's accounts. For example, the customer can initiate a direct debit transaction to withdraw funds from their personal account. Transaction processing system 114 can evaluate a plurality of characteristics of the requested transaction (e.g., requesting user, amount, account(s) involved, timestamp, requesting location, etc. and determine whether any security protocols are currently active for the customer and/or the account.

Figure 7A:
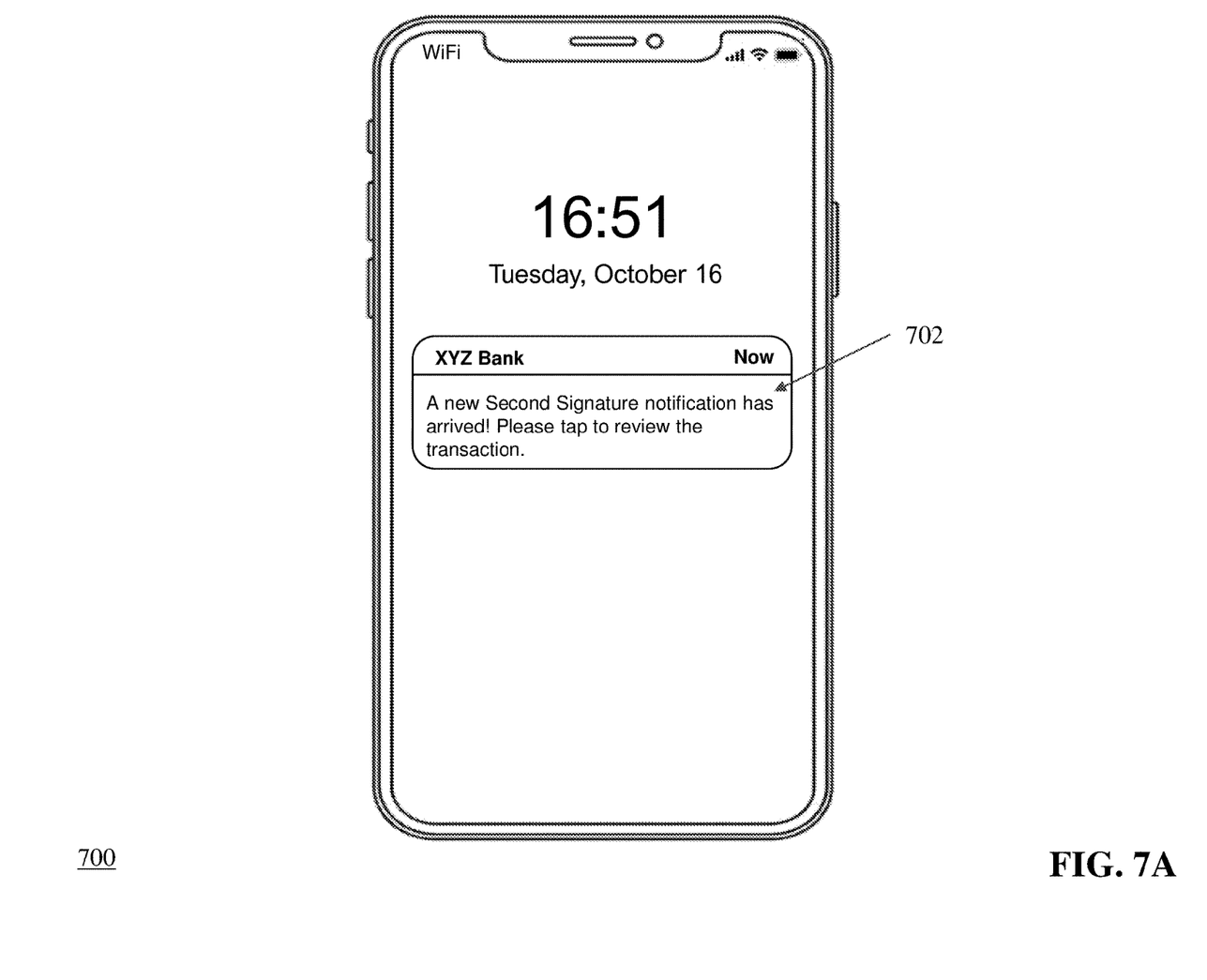
FIG. 7A is a diagram of an exemplary user interface depicting a notification message generated by a transaction processing system to request a third party's review and approval.

In a situation where security module 108c has applied a security protocol due to diminished capacity, transaction processing system 114 can process (step 210) the request based upon the security protocol by initiating one or more security workflows in response to the requested transaction. As mentioned above, the customer's profile may be configured to require review and approval by a third party prior to completion of specific transactions associated with the customer's personal account. Transaction processing system 114 determines from the customer's security protocol that their daughter must be notified and submit approval for the requested transaction. Transaction processing system 114 retrieves contact data (e.g., email address, mobile phone number) for the daughter from the customer's security protocol and transmits a notification message to the daughter's computing device(s). FIG. 7A is a diagram of an exemplary mobile device user interface 700 depicting a notification message generated by transaction processing system 114 to request a third party's review and approval. As shown in FIG. 7A, transaction processing system 114 issues a notification message 702 to an application installed on the daughter's mobile device (e.g., via a push request) that informs the daughter of a pending transaction submitted by the customer. The daughter can select the message to launch the corresponding application and review the details of the pending transaction.

Figure 7B:
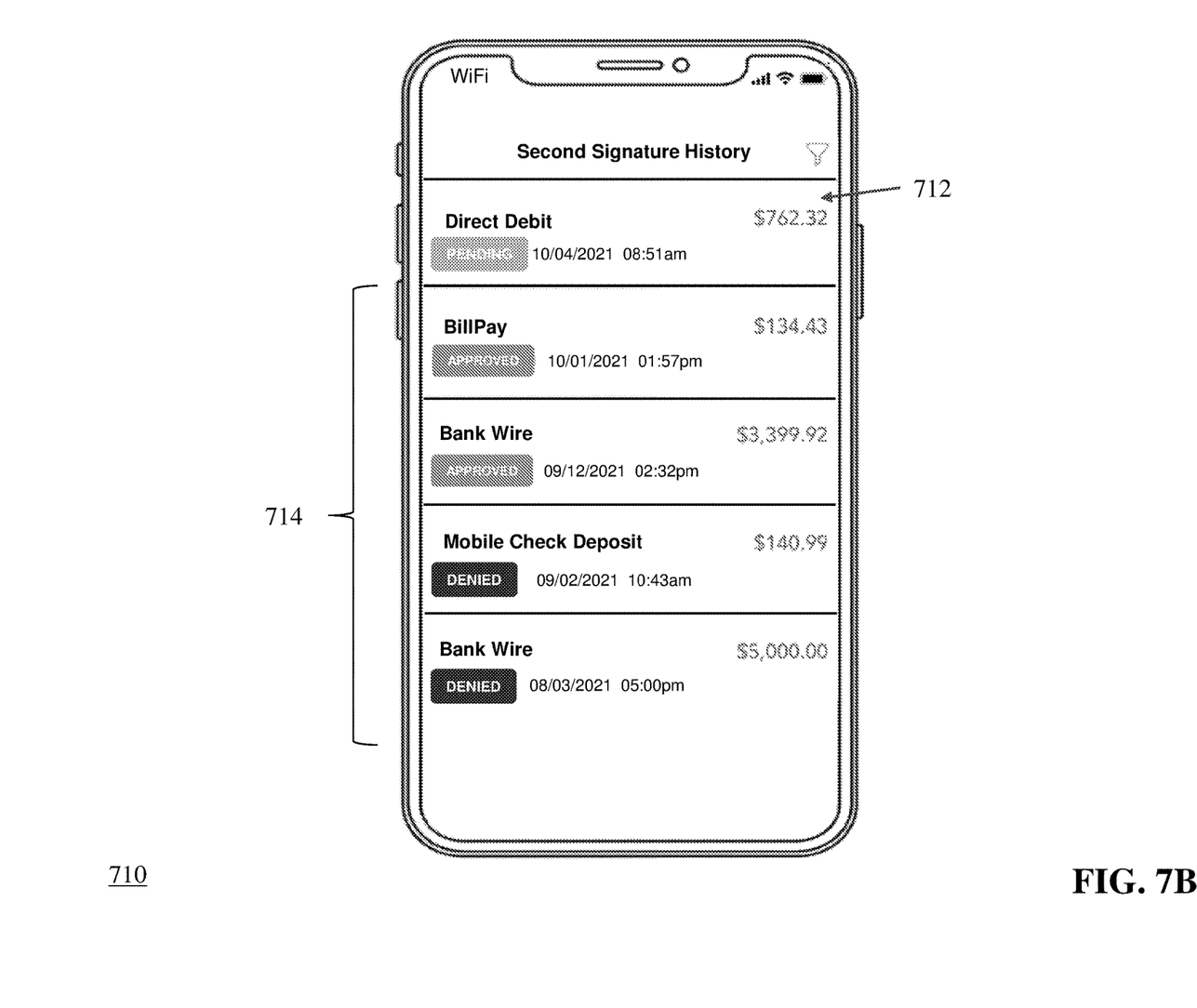
FIG. 7B is a diagram of an exemplary user interface depicting a transaction review screen generated by the transaction processing system.

FIG. 7B is a diagram of an exemplary mobile device user interface 710 depicting a transaction review screen generated by transaction processing system 114. As shown in FIG. 7B, the daughter views details of the pending transaction 712, including transaction type ('Direct Debit'), transaction amount ('$762.32'), and transaction request time ('10/04/2021 08:51 am'). The daughter can review the transaction details and decide whether the customer should be authorized to complete the transaction. The daughter can also view other recent transactions 714 and their corresponding details, including the approval decision for each.

Figure 7C:
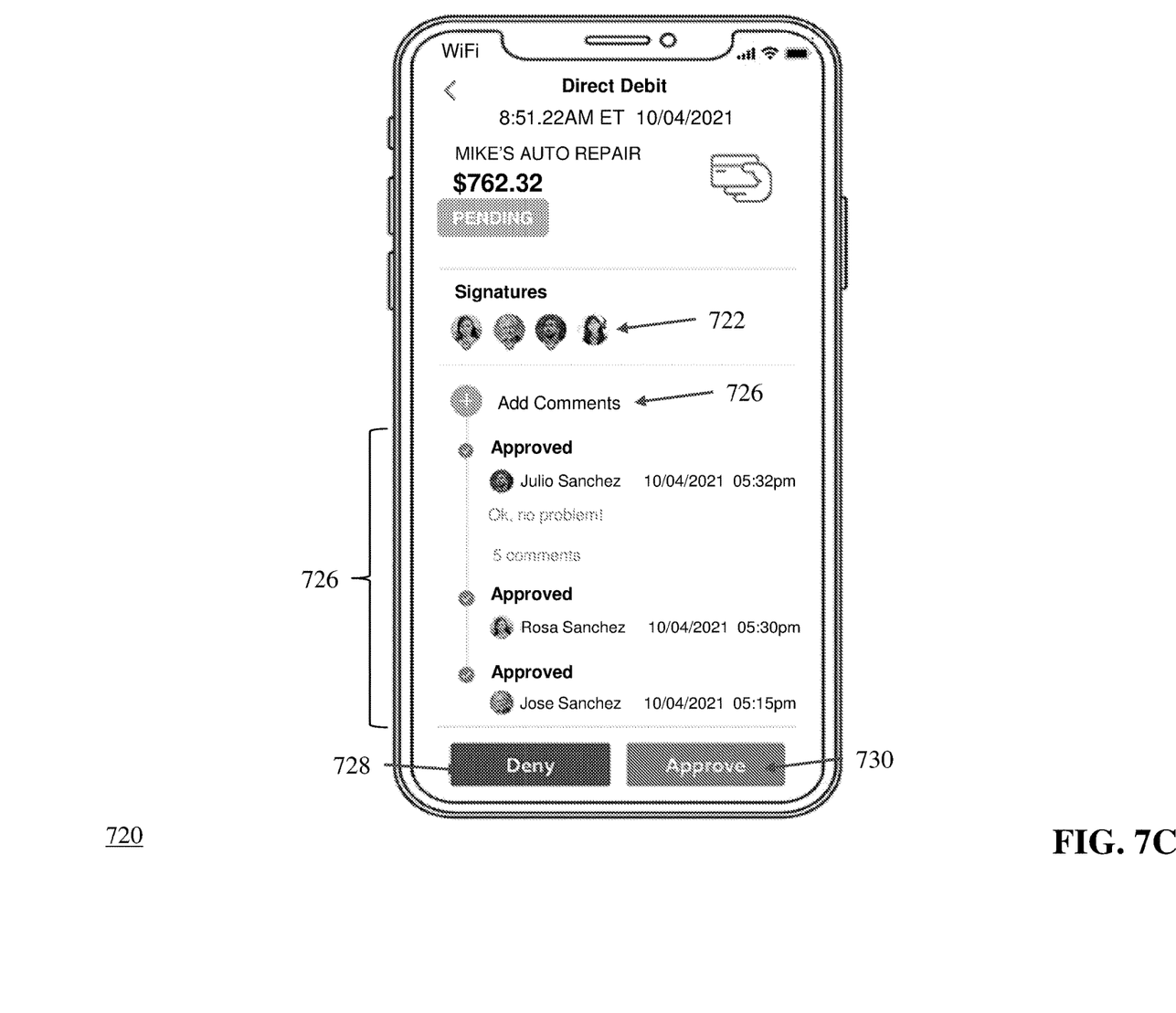
FIG. 7C is a diagram of an exemplary user interface depicting a transaction approval screen generated by the transaction processing system.

The daughter can click on the pending transaction 712 to submit her decision on whether to approve or deny the transaction. FIG. 7C is a diagram of an exemplary mobile device user interface 720 depicting a transaction approval screen generated by transaction processing system 114. As shown in FIG. 7C, the daughter can view additional details for the pending transaction, such as the entity associated with the transaction ('Mike's Auto Repair') and one or more other third parties 722 that have already submitted an approval or denial decision for the transaction. In area 724, the daughter can also see a timeline of the decisions made by the other third parties, including one or more comments submitted in conjunction with the decisions. The daughter can also add her own comments using button 726. Once the daughter has made her decision, she can select one of the buttons (Deny 728, Approve 730) at the bottom of the screen to submit the decision. In some embodiments, the decisions of each third party can act as a voting process whereby the transaction is not approved unless all or a majority of the third parties approve. In other embodiments, one or more of the third parties are considered as a master decision maker for the customer/account, such that that third party can unilaterally decide whether to approve or deny the transaction after reviewing the other decisions.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the technology described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7

(SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, Mozilla® Firefox available from Mozilla Corporation, and/or Safari™ available from Apple Inc.). Mobile computing device include, for example, a Blackberry® from Research in Motion, an iPhone® from Apple Inc., and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of identifying diminished capacity of a voice call participant based on audio data analysis, the method comprising:
    capturing, by a server computing device, at least a portion of a digital audio stream exchanged between a client computing device and an agent computing device during a voice call, the digital audio stream comprising a waveform signal corresponding to speech data of a first user on the voice call;
    generating, by a server computing device, an audio image based on the captured portion of the digital audio stream, wherein the audio image comprises a spectral image file representing one or more frequency bands of the speech data;
    extracting, by the server computing device, one or more features of the audio image that correspond to the frequencies of the speech data;
    executing, by the server computing device, a deep learning classification model on the extracted features of the audio image to assign a diminished capacity score to the audio image;
    applying, by the server computing device, a security protocol to an account associated with the first user when the diminished capacity score is at or above a threshold value;
    receiving, by the server computing device, a transaction request corresponding to the account from the first user; and
    processing, by the server computing device, the transaction request based on the security protocol applied to the account.

2. The method of claim 1, wherein the audio image comprises a Mel-Frequency Cepstral Coefficients (MFCC) spectrum image.

3. The method of claim 2, wherein the deep learning classification model comprises a convolutional neural network.

4. The method of claim 3, wherein the server computing device trains the deep learning classification model to label audio images for diminished capacity using a training data set comprised of (i) existing MFCC spectral images labeled as diminished capacity, (ii) existing MFCC spectral images labeled as not diminished capacity and (iii) unlabeled MFCC spectral images.

5. The method of claim 4, wherein the server computing device re-trains the trained deep learning classification model after the model has classified one or more audio images that are not part of the training dataset.

6. The method of claim 1, wherein the server computing device adjusts the diminished capacity score based on one or more of: a comparison of the diminished capacity score to one or more historical diminished capacity scores corresponding to the first user, an age of the first user, speech to text analysis of the captured portion of the digital audio stream, or feedback from prior voice calls involving the first user.

7. The method of claim 1, wherein the security protocol defines one or more account transactions that are prohibited when the diminished capacity score is at or above the threshold value.

8. The method of claim 1, wherein the security protocol defines one or more account transactions that require review by a second user prior to execution when the diminished capacity score is at or above the threshold value.

9. The method of claim 8, wherein processing the transaction request comprises transmitting a transaction review request to a computing device of the second user upon receiving the transaction request corresponding to the account from the first user.

10. The method of claim 9, wherein the server computing device transmits an execution instruction to a transaction processing system when the second user completes a review of the transaction request.

11. The method of claim 1, wherein the security protocol defines one or more account transactions that require approval by a second user prior to execution when the diminished capacity score is at or above the threshold value.

12. The method of claim 11, wherein processing the transaction request comprises transmitting a transaction approval request to a computing device of the second user upon receiving the transaction request corresponding to the account from the first user.

13. The method of claim 12, wherein the server computing device transmits an execution instruction to a transaction processing system when the second user approves the transaction request.

14. A system for identifying diminished capacity of a voice call participant based on audio data analysis, the system comprising a server computing device having a memory for storing computer-executable instructions and a processor that executes the computer-executable instructions to:

capture at least a portion of a digital audio stream exchanged between a client computing device and an agent computing device during a voice call, the digital audio stream comprising speech data corresponding to a first user on the voice call;

generate an audio image based on the captured portion of the digital audio stream, wherein the audio image comprises a spectral image file representing one or more frequencies of the speech data;

extract one or more features of the audio image that correspond to the frequencies of the speech data;

execute a deep learning classification model on the extracted features of the audio image to assign a diminished capacity score to the audio image;

apply a security protocol to an account associated with the first user when the diminished capacity score is at or above a threshold value;

receive a transaction request corresponding to the account from the first user; and     process the transaction request based on the security protocol applied to the account.

15. The system of claim 14, wherein the audio image comprises a Mel-Frequency Cepstral Coefficients (MFCC) spectrum image.

16. The system of claim 15, wherein the deep learning classification model comprises a convolutional neural network.

17. The system of claim 16, wherein the server computing device trains the deep learning classification model to label audio images for diminished capacity using a training data set comprised of (i) existing MFCC spectral images labeled as diminished capacity, (ii) existing MFCC spectral images labeled as not diminished capacity and (iii) unlabeled MFCC spectral images.

18. The system of claim 17, wherein the server computing device re-trains the trained deep learning classification model after the model has classified one or more audio images that are not part of the training dataset.

19. The system of claim 14, wherein the server computing device adjusts the diminished capacity score based on one or more of: a comparison of the diminished capacity score to one or more historical diminished capacity scores corresponding to the first user, an age of the first user, speech to text analysis of the captured portion of the digital audio stream, or feedback from prior voice calls involving the first user.

20. The system of claim 14, wherein the security protocol defines one or more account transactions that are prohibited when the diminished capacity score is at or above the threshold value.

21. The system of claim 14, wherein the security protocol defines one or more account transactions that require review by a second user prior to execution when the diminished capacity score is at or above the threshold value.

22. The system of claim 21, wherein processing the transaction request comprises transmitting a transaction review request to a computing device of the second user upon receiving the transaction request corresponding to the account from the first user.

23. The system of claim 22, wherein the server computing device transmits an execution instruction to a transaction processing system when the second user completes a review of the transaction request.

24. The system of claim 14, wherein the security protocol defines one or more account transactions that require approval by a second user prior to execution when the diminished capacity score is at or above the threshold value.

25. The system of claim 24, wherein processing the transaction request comprises transmitting a transaction approval request to a computing device of the second user upon receiving the transaction request corresponding to the account from the first user.

26. The system of claim 25, wherein the server computing device transmits an execution instruction to a transaction processing system when the second user approves the transaction request.

\* \* \* \* \*

UNITED STATES PATENT AND TRADEMARK OFFICE
CERTIFICATE OF CORRECTION

| | | |
|---|---|---|
| PATENT NO. | : 12,039,531 B2 | Page 1 of 1 |
| APPLICATION NO. | : 18/139482 | |
| DATED | : July 16, 2024 | |
| INVENTOR(S) | : Eoghan Considine et al. | |

It is certified that error appears in the above-identified patent and that said Letters Patent is hereby corrected as shown below:

In the Specification

Column 4, Line 23 reads:
"Zoom™ Microsoft® Teams™, WebEx®, or other similar"
Should read:
--Zoom™, Microsoft® Teams™, WebEx®, or other similar--

Column 5, Line 65 reads:
"fox™ Chrome™, Safari™, and other similar software."
Should read:
--fox™, Chrome™, Safari™, and other similar software.--

In the Claims

Claim 15:
Column 17, Line 27 reads:
"comprises a Mel-Frequency Cepstral Coefficients (MF CC)"
Should read:
--comprises a Mel-Frequency Cepstral Coefficients (MFCC)--

Signed and Sealed this
Twenty-fifth Day of March, 2025

Coke Morgan Stewart
*Acting Director of the United States Patent and Trademark Office*